Sept. 14, 1926.
C. LAMB ET AL
1,599,775
ROTARY HOSE COUPLING
Filed Nov. 3, 1924
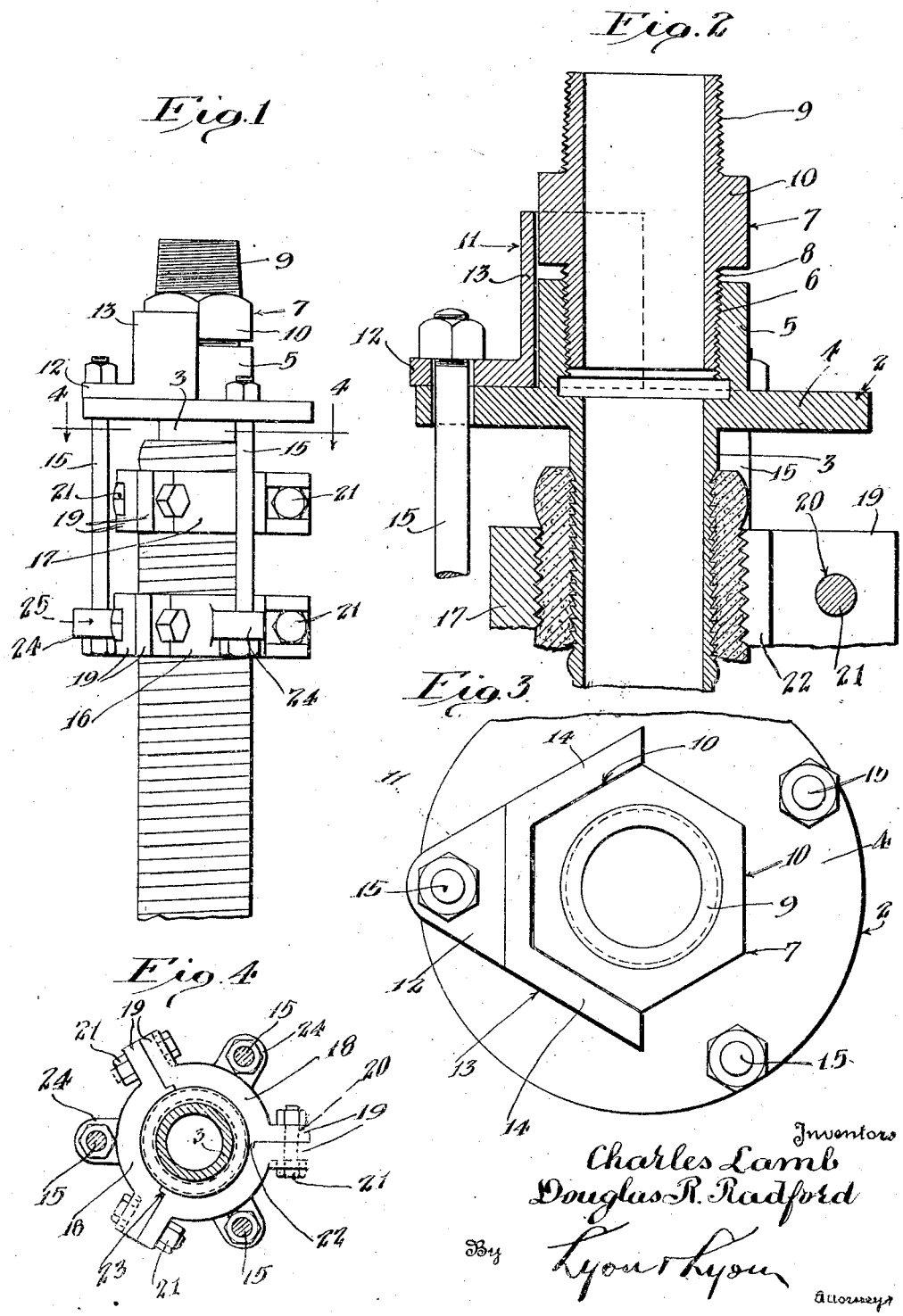

Patented Sept. 14, 1926.

1,599,775

UNITED STATES PATENT OFFICE.

CHARLES LAMB AND DOUGLAS R. BADFORD, OF LOS ANGELES, CALIFORNIA, ASSIGNORS TO WEST AMERICAN RUBBER COMPANY, OF LOS ANGELES, CALIFORNIA, A CORPORATION OF CALIFORNIA.

ROTARY HOSE COUPLING.

Application filed Novemebr 3, 1924. Serial No. 747,542.

This invention relates to a hose coupling and refers particularly to the type of hose coupling employed for connecting the hose to the swivel of a rotary drilling rig so that flushing fluid under considerable pressure may be supplied to the drilling apparatus during drilling operations.

The hose couplings for oil well use must stand a considerable pressure, frequently up to a thousand pounds per square inch and considerable difficulty has been encountered with the present type of hose coupling in preventing the same from tearing apart during use. Moreover, the hose couplings are subject to considerable wear, particularly where the couplings are attached to the swivel of the rotary drilling apparatus.

It is an object of the present invention to provide a simple and economical form of rotary hose coupling which incorporates certain improved means for preventing the hose tearing away from the coupling and which incorporates certain improved means for attaching the coupling to the swivel or other device connected therewith, which latter means may be readily replaced upon wear and thus the life of the hose coupling considerably increased.

The invention includes certain novel parts, combination of parts, and features which will be more thoroughly understood from a description of the preferred example of the hose coupling embodying the invention.

For this purpose, reference is made to the accompanying drawings, in which a preferred embodiment of the hose coupling of this invention is illustrated.

In the drawings:
Figure 1 is an elevation of the hose coupling.

Fig. 2 is an enlarged elevation mainly in vertical section with certain of the clamping members removed and the stem or nipple broken off to contract the view.

Fig. 3 is a plan view; and

Fig. 4 is a transverse section on the line 4—4 of Fig. 1.

Referring to the drawings, the coupling there illustrated comprises a flange member 2 provided with elongated stem or nipple 3 over which the hose is adapted to be inserted, such stem 3 being roughened throughout at least the major portion of its length. At the base of the stem 3 the member 2 is provided with a radial flange 4 and upon opposed sides of the flange 4 from the stem or nipple 3 the member provides a tapered socket 5 threaded as indicated at 6. 7 indicates a replaceable nipple having a stem 8 screw threaded into the socket 5 of the member 2 and provided with an opposed threaded stem 9 for connection with the swivel or other parts of a rotary drilling apparatus. Between the stems 8 and 9, the nipple 7 is enlarged as at 10 to provide a means by which the nipple may be engaged with a wrench or the like and inserted or removed from the member 2, the flange 10 being flattened on its side preferably in the form of a hexagonal nut. Such flange 10 also provides part of a means provided in the coupling for positively locking the nipple 7 from removal from the flange member 2. Such locking means also includes a locking member 11 having the part 12 positioned flat-wise against the upper side of the flange 4 and also a part 13 extending up along one side of the threaded socket 5 and provided adjacent the flange 10 of the replaceable nipple 7 with the flat surfaces 14 shaped to conform with the exterior of the flange 10 and prevent rotation thereof during use of the hose coupling. The lock member 11 is held in place by a bolt 15 passing through registered openings in the part 12 of the member and flange 4. The bolt 15 also provides part of the means employed for positively anchoring a clamping member 16 to the member 2, a plurality of similar bolts 15 being connected to the flange 4 at circularly spaced points and engaging at their opposed sides the clamping member 16 in a manner hereinafter more particularly pointed out.

The opposed clamp is provided with a plurality of clamping members of which 16 is the lower, 17 indicating an upper clamping member. Such clamping members are each constructed in a plurality of segments 18 which may be of any desired number, the members 16 and 17 being disclosed as each including three segments 18. Such segments 18 together define a cylindrical inner clamping bore preferably roughened as indicated in Fig. 1. The segments 18 are provided at their ends with radially extending flanges 19 positioned flat-wise against similar flanges of adjacent segments and such flanges 19 are provided with openings 20 to receive clamping bolts 21 which may be employed for tightening the same about a hose inserted over the stem 3 of the member 2. The segments 18 are each provided with a dog 22 at the inner side of one end and with a corresponding recess 23 at the opposed end so that by engagement between adjacent dogs and recesses 23 of the different segmental members of each clamp 16 and 17, the segmental members 18 are guided in their contacting operations.

The lower clamping member 16 is provided with a plurality of bosses 24 having vertical openings 25 to receive the bolts 15 which constitute a means for positively anchoring the clamping member 16 to the coupling member 2.

In use, a hose is first inserted over the elongated roughened stem 3 of the main coupling member and the upper clamping member 17 is tightened by means of bolts 21 upon the hose so inserted near the upper end of the hose or boss of the stem 3. The lower clamping member 17 is then tightened by means of its bolts 21 about the hose near the lower end of the stem 3. The bolts 15 are then drawn up to rigidly hold the clamping member 16 to the flange 4 and thus to the main coupling member 2.

A hose coupling thus constructed will be found to withstand a great deal of pressure without the hose being stripped or drawn off from the stem 3. This is due to the positive means that are provided for anchoring the lower clamping member 16 to the main coupling member 2. In practice, it has been found that under the great pressure necessary in rotary drilling apparatus the lower clamping member of such a coupling tends to pull off the stem and in consequence thereof the hose frequently is thrown off from the coupling member 2. The anchoring of such clamping member 16 to the coupling member 2 effectively prevents such action.

The coupling 7 of the clamp may be replaced as the same wears, due to the action of mud or other matter constituting part of the flushing fluid passed through the connection. The locking member 11 insures that such replaceable nipple is positively held to the major coupling member 2.

While the form of hose clamp herein described is well suited for the purposes of this invention, various modifications may be made in the details of construction without departing from the spirit of the invention. This invention is of the scope set forth in the appended claim.

We claim:

In a coupling of the class described, the combination of a main coupling member having a threaded socket at one end and an elongated roughened stem at the other end, the main coupling member having a circular radially extending flange disposed between said stem and socket, a clamp member mounted upon said roughened stem and slidable on bolts connected to said flange, and a second clamping member disposed between said first clamp and said flange.

Signed at Los Angeles, California, this 27th day of October, 1924.

DOUGLAS R. RADFORD.
CHARLES LAMB.